Sept. 26, 1950     W. R. WEEKS     2,523,796
PORTABLE ROASTER AND BROILER
Filed March 4, 1948     4 Sheets-Sheet 1
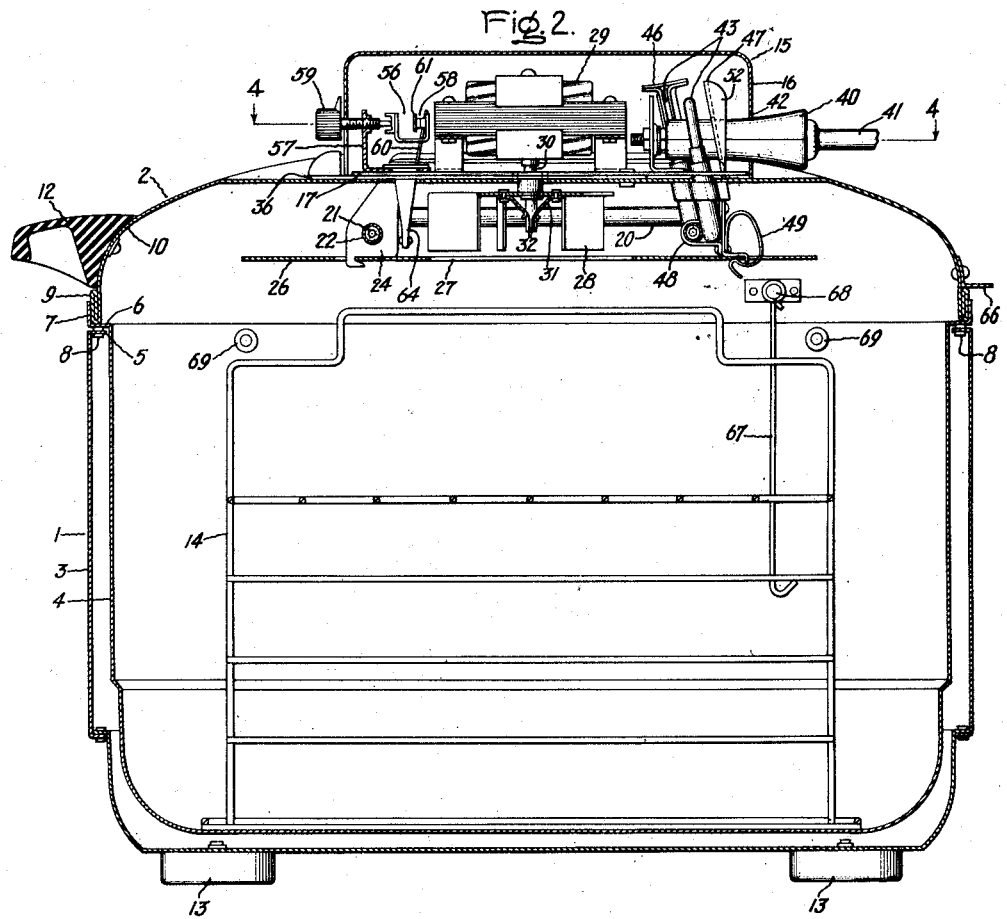
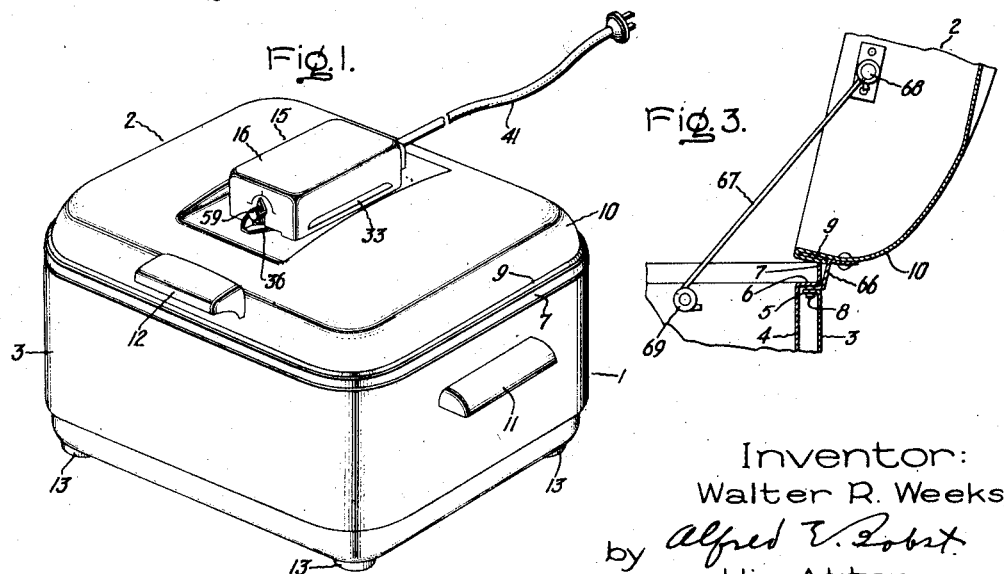
Inventor:
Walter R. Weeks,
by Alfred V. Lobst
His Attorney.

Sept. 26, 1950 W. R. WEEKS 2,523,796
PORTABLE ROASTER AND BROILER
Filed March 4, 1948 4 Sheets-Sheet 2
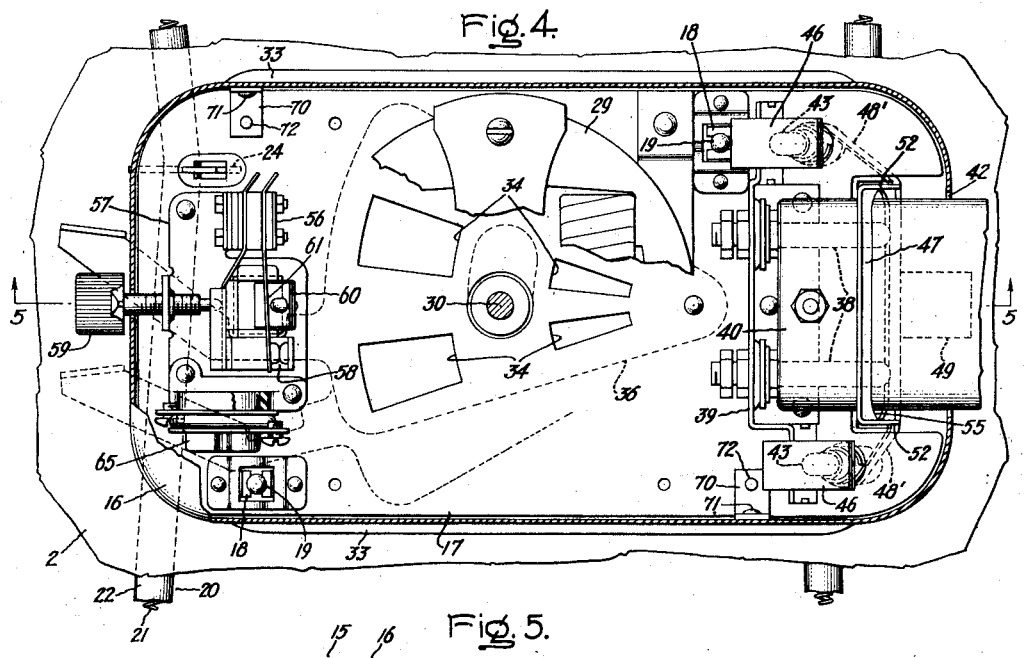
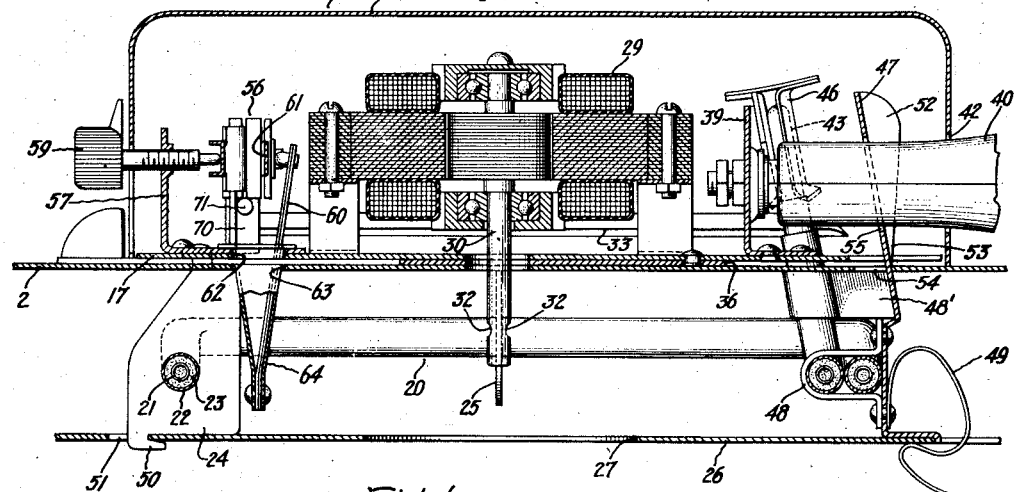
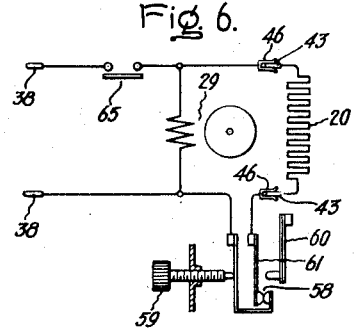
Inventor:
Walter R. Weeks,
By Alfred T. Robert
His Attorney.

Sept. 26, 1950 W. R. WEEKS 2,523,796
PORTABLE ROASTER AND BROILER
Filed March 4, 1948 4 Sheets-Sheet 3

Inventor:
Walter R. Weeks,
by Alfred V. Robert
His Attorney.

Sept. 26, 1950 W. R. WEEKS 2,523,796
PORTABLE ROASTER AND BROILER
Filed March 4, 1948 4 Sheets-Sheet 4

Inventor:
Walter R. Weeks,
by Alfred V. Robert.
His Attorney.

Patented Sept. 26, 1950

2,523,796

UNITED STATES PATENT OFFICE 2,523,796

PORTABLE ROASTER AND BROILER

Walter R. Weeks, Hamden, Conn., assignor to General Electric Company, a corporation of New York Application March 4, 1948, Serial No. 12,942

5 Claims. (Cl. 219—35)

My invention relates to improvements in electrical cooking appliances, particularly double-purpose cookers which may be used alternatively for roasting or broiling. The particular field in which my invention is most useful is that of portable, electrically-heated, domestic roasters and broilers.

Cooking appliances of the roaster type have been sometimes bulky, heavy, and uneconomical to operate. Because of their portability, fire hazards sometimes accompany their use. Difficulties in cleaning are also encountered in known roaster constructions. Among the objects of my invention are to make a combination roaster and broiler which is light in weight, safe to use, economical to operate, attractive, durable, and easy to clean, repair, convert, or inspect. Improved cooking of products has been one result of the constructions involved in my invention.

The above objects and others are attained through improvements in the construction of the cooking chamber body, in the electrical and mechanical connections between the appliance cord, plug and the current consuming parts of the device, in novel positioning of the heating unit with respect to the cooking chamber, in air circulation and direction in the cooking chamber, and in making the various parts easily and quickly removable from each other.

Other objects and details of that which I believe to be novel and my invention will be apparent from the following description and claims taken in conjunction with the accompanying drawings in which is illustrated an exemplary form of combined roaster and broiler embodying the present invention.

Figure 7:
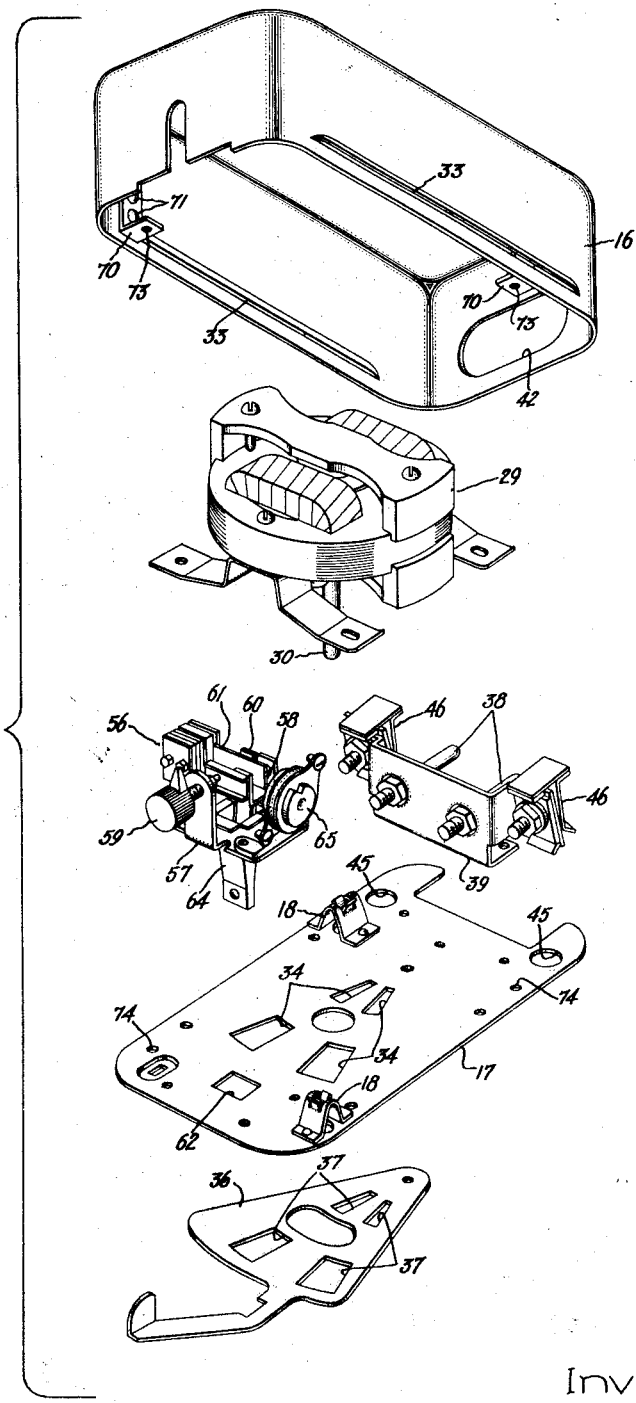
Figure 8:
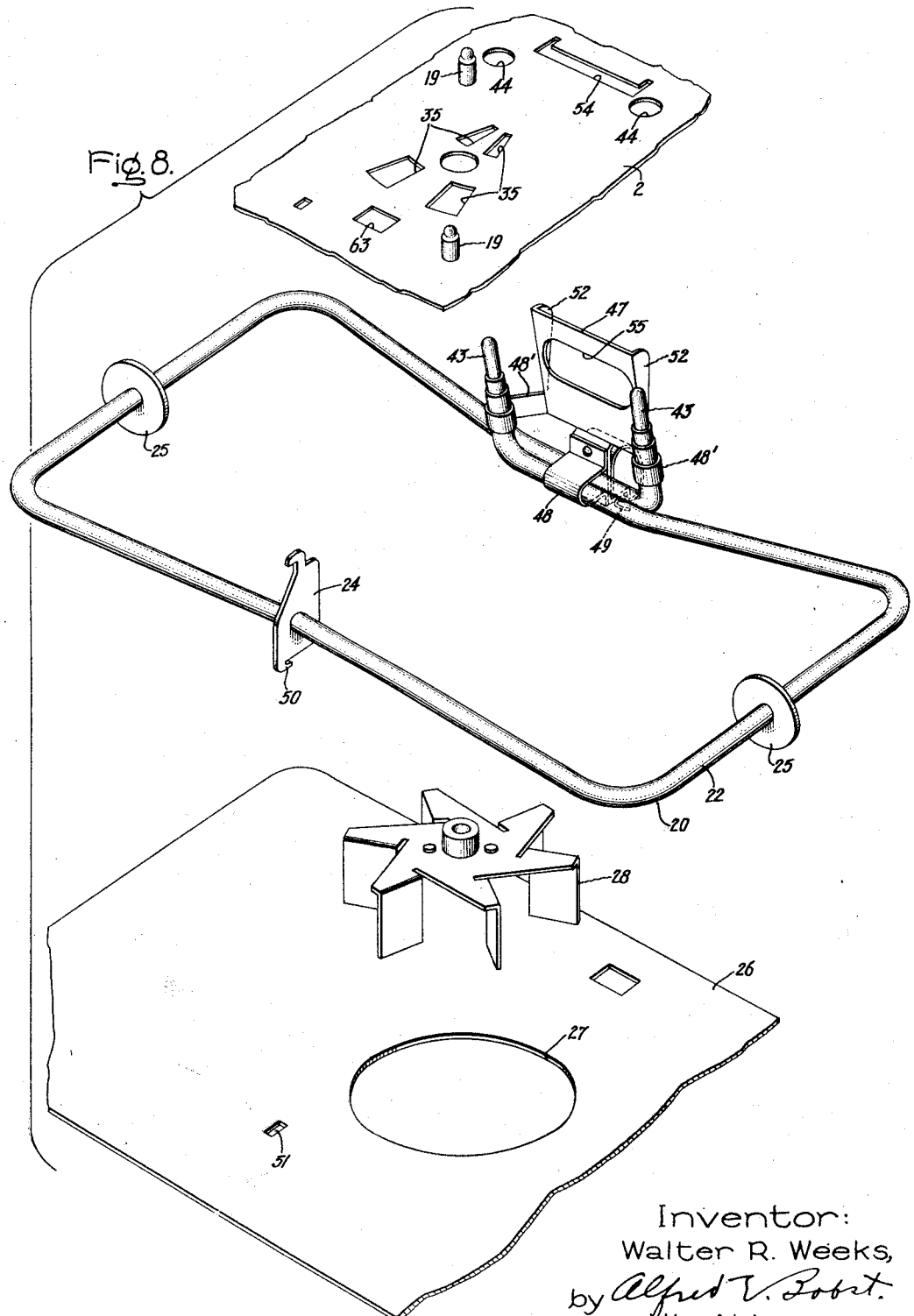

In the drawing, Fig. 1 is a general perspective view of a roaster-broiler; Fig. 2 is a section and partial elevation on a larger scale, showing the roaster-broiler; Fig. 3 is a fragmentary sectional view similar to a part of Fig. 2, but showing the cover in open position; Fig. 4 is an enlarged sectional view of the connection and control housing taken substantially on line 4—4 of Fig. 2; Fig. 5 is a vertical sectional view taken substantially on line 5—5 of Fig. 4 with certain parts omitted for clarity; Fig. 6 is a wiring diagram indicating the principal electrical parts and their connections to each other; Fig. 7 is an exploded perspective view of the control and connection housing, together with the parts which are housed therein; and Fig. 8 is an exploded perspective view showing the baffle plate, fan, heater unit, and a fragment of the cover to which these parts are attached.

In the form of appliance shown in the drawings, the cooking chamber is formed of a body portion 1 and a cover portion 2. The body is made of two sections which I will call an outer shell 3 and an inner well 4. The shell has an open top with an inturned flange 5. The well has an outwardly extending flange 6 with an upturned edge 7, within which the edges of the cover can seat. Spacing rivets 8 on the shell flange 5 serve as supports for the well flange 6, and allow the well to be removably nested within the shell in spaced relation thereto. This construction reduces edge heat losses.

The inner well is formed so as to conform generally to the shape of the outer shell and to provide a narrow space between the two. The dimension between the shell and well is selected so that there is the least transfer of heat. This is accomplished because of reduced eddy current flow of air in this space. The transfer of heat is also controlled by the use of a bright buffed finish on the inside and outside of the well and by a white painted finish or enamel on the shell sides. I have found that a satisfactory material for the well is sheet aluminum. The bright surfaces of the well and the white painted surfaces of the shell reduce radiation losses.

The cover 2, as shown, is provided with side flanges 9 which merge into curved sections 10 to provide a contour which is generally dome-shaped. The usual handles 11 are provided on the outer shell, and a handle 12 is provided on one edge of the cover. Foot members 13 are secured to the bottom of the shell so that the roaster-broiler may be placed on an ordinary table surface while in use. For holding a pan or other cooking utensil, a removable rack 14 may be provided, and this rack may have any desired arrangement of shelves.

According to my invention, the cover rather than the cooking body or chamber is used to support the heating unit and all of the electrical connections and controls. Because of this, the cover can be called a supporting body. On top of the cover is mounted a control and connection housing 15 which consists of a cover piece 16 and a base plate 17. These are removably secured to the roaster-broiler cover by spring clips 18 on the base plate which engage with posts 19 on the cooker cover. The housing cover may be removably secured to its base plate, for instance, by angle clips 70 fastened to the cover by rivets 71 and to the base plate by screws 72 through threaded holes 73 and clearance holes 74.

On the inside of the cover, under the dome, is removably secured the heater unit 20. I have shown a heating element of the character patented by C. C. Abbott 1,367,341 on February 1, 1921, a type commonly used in the heating arts. It includes a helical resistance conductor 21 housed within an outer metallic sheath 22, with a highly compacted heat conducting and electrical insulating material 23, such as powdered magnesium oxide, to support the conductor in spaced relation within the sheath. This unit is substantially rigid and self-supporting and is removably secured to the cover. I have shown a hook member 24 which engages with slots in the cover and in the base plate of the connection housing. The other side of this heater unit is held in place by terminal constructions and interlocking devices which will be later described. Metal disks 25 serve as spacers between the cooker cover and other portions of the heating unit. It will be noted that the heating unit is of roughly ring-like or annular form.

Under the heating unit and parallel to the cover is removably secured a baffle plate or shield 26. This baffle masks the interior of the cooking chamber from radiant heat produced by the heater. The edges of the baffle are spaced from the boundary flanges of the cover and a hole 27 is formed in the center of the baffle. Immediately above this central hole is a centrifugal fan 28 which is used to circulate air in a manner to be later described.

The circulating fan is driven by a motor 29 which is mounted on the base plate of the control and connection housing. A shaft 30 extends from the motor through a hole in the base plate and a corresponding hole in the cover, and removably supports the fan by a spring clip 31 on the fan which engages with notches 32 on the motor shaft. The motor is cooled by air which may enter through louvers 33 in the control and connection housing. In order to increase the cooling effect as well as to provide for the controlled admission of air to the cooking chamber, a set of holes 34 in the base plate and corresponding holes 35 in the cover are provided, these holes being opened or closed by a shutter 36 which has a duplicate set of holes 37. When the shutter is in the position where its holes register with those in the base plate and in the cover, operation of the fan will draw air in through the louvers of the housing, around the motor, down through the open holes and into the cooking chamber.

The electrical controls, connections and circuits for the motor and for the heater are all carried by and within the control and connection housing. Disregarding the controls for the moment, the housing contains terminal constructions for removably receiving an ordinary appliance connection plug and for removably receiving the terminals of the heating unit. As shown best in Figs. 4 and 5, an appliance plug receiving socket with posts 38 is supported on a bracket 39 on the base of the housing. An appliance plug 40 at the end of a usual cord set 41 can be inserted through a hole 42 in the side of the housing to make contact with the socket posts.

At the ends of the heating unit are terminals 43 which extend freely through holes 44 in the cover and holes 45 in the base plate into removable engagement with sockets 46 which are mounted within the housing. Wires (not shown) connect the heater unit in circuit in the relationship indicated in Fig. 6. Engagement of the heater terminals with their sockets helps to hold the heater unit in place, but additional means are provided for making this removable support more positive. A piece in the form of a projecting arm or web 47 is secured to the heater unit, for instance by a strap 48 which is riveted to the web, and by side arms 48' which grip the ends of the heater just below the terminals. This web also carries a spring clip 49 which removably holds one edge of the baffle plate in place. The opposite edge of the baffle plate is supported below the cover and the heater unit by means of a hook 50 on the hook member 24 which engages with a slot 51 in the baffle plate.

The arm or web 47 is used to provide an interlock between the removable heater and the removable appliance connection plug. Side ears 52 stiffen the upper portion of the web, and the tapered ends 53 of these ears help in promoting proper frictional engagement with a slot 54 in the cover to assist in holding the heater unit in position. In order to promote safety, it is desirable that the heater unit be neither inserted nor withdrawn while the connection plug is energizing the electrical parts. Therefore, a hole 55 is provided in the web, and this hole closely surrounds the path of insertion or withdrawal of the appliance plug. It will be seen, therefore, that if the plug is in place in its socket, the top edge of the web will prevent insertion of the heater unit into its socket. If the parts are assembled, the heater unit cannot be withdrawn while the plug is in place because the top edge of the hole 55 will engage the plug 40.

Suitable heating controls are provided, and these are also mounted in the control and connection housing, and removable therewith. I have shown a thermoresponsive switch 56 mounted on a bracket 57 with contacts 58 which are adjustable by means of a control knob 59. A bimetallic element 60 will open the contacts 58 in response to changes in temperature, the contact being closed by the resilient action of arm 61 of the switch.

In operation, the bimetallic element will detect the temperature of the air, and when the desired temperature has been reached, the bimetal will open the contacts to interrupt the circuit to the heating unit, the fan continuing to operate. When the temperature drops below the set point of the contacts, the bimetal will have flexed in the opposite direction so that the spring arm 61 will close the contacts and restore the circuit to the heating element.

In order to make sure that the thermosensitive switch will operate in response to heat within the cooking chamber, I have extended the mounting of the bimetal 60 so that it projects through the base plate hole 62 and a corresponding hole 63 in the cover, into the space under the cover. An envelope 64 securely holds the end of the bimetal and supports it from the base plate through the medium of bracket 57.

If desired, a tilt-operating switch may be used to interrupt the heater circuit and the motor circuit whenever the cover is opened or tilted. I have shown for this purpose a switch 65 of the "mercury button" type, such as disclosed in U. S. Patent 2,101,092, J. H. Payne, Jr., which issued December 7, 1937, and is assigned to the same assignee as the present invention. Any other satisfactory type of tilt-operating switch may be used, as long as it will interrupt the electrical circuit automatically when the cover is tilted away from its normal horizontal operating position.

For some purposes, it is obvious that a manually operated switch might be used to break the circuit, but without the automatic action of the tilt-operating switch.

Although I have spoken of a tilting of the cover, which would imply a hinge connection between the cover and the cooking chamber, it is preferable that any hinge connection be of a nonpermanent type so that the cover can be easily removed for cleaning. One way of accomplishing this is by providing angular ears or lugs 66 on the cover which will bear on the upturned edge 7 on the well flange when the cover is lifted by its handle 12. These ears will permit loose hinging but will not prevent easy removal of the cover. If it is desired to hold the cover in its open position, as shown in Fig. 3, I may provide wire hooks 67, which are pivoted at points 68 within the cover and are engageable with buttons 69 within the well whenever the cover is opened. Two sets of buttons 69 may be provided so that the cover may be seated in either direction upon the inner well.

In operation of the appliance as a roaster, the heating element is energized by power supplied from the cord set through the appliance plug and control switches to the heater terminals. The motor is also energized to drive the centrifugal fan. With the baffle in place, direct radiation of heat from the heater to the food within the cooking chamber is prevented, but operation of the fan will draw air up through the hole 27 in the baffle plate and direct the air outwardly toward and across the annular heating unit which surrounds the fan in the space between the baffle plate and the cover. The air will thus be heated and will then be discharged at the edges of the baffle plate and directed downwardly by the dome-shaped cover into the cooking chamber where it will circulate and eventually be drawn upward through the hole 27 to complete its path of movement. The rapidly circulating air exercises a "scrubbing" effect on food within the cooker, and I have found that this makes it possible to cook food at much lower heater temperatures and in a much shorter time than is required without the fan. This is probably due to a more even distribution of heat, and the elimination of stagnant air.

When it is desired to use the device as a broiler, it is necessary only to disengage the spring clip 49 from the baffle plate and remove the plate from the supporting hook 50. This will expose food within the cooker to direct radiation from the heater element, the under side of the cover acting as a reflector to aid in spreading the radiation in a uniform manner. The fan may be used or not, as desired. If it is not desired to use the fan, it may be removed easily by snapping the spring clip 31 from its notched seat 32 on the motor shaft 30. However, experience has shown that with some foods, at least, improved broiling is obtained with operation of the fan even though the baffle plate is not in place.

When it is desired to clean the appliance, the easy removability of the various parts facilitates this operation. Assuming that a cooking operation has just been completed, the cover will be opened and the circuit to the heater will be interrupted, either through action of the tilt switch or alternatively through manual operation of a control switch.

The food may be removed from the rack and the rack removed from the cooking well with safety. The baffle plate may be removed as above described, and cleaned as a separate piece. However, before the heating element or the control and connection housing may be removed, it is first necessary to disconnect the appliance plug from its socket within the housing. After this plug has been removed, the heating unit may be removed. The fan is snapped off from the motor shaft, and the housing snapped from the supporting posts 19. This will leave the cover as a separate piece which may be washed or otherwise cleaned without wetting the electrical parts.

The inner well is simply lifted out of the outer well and both of these parts may be washed separately both inside and outside with ease.

Assembly of the parts is equally simple. The well is placed within the shell, the housing, fan, heater, and baffle plate are snapped in place on the cover, and when the appliance plug is inserted with the cover in place on the assembled cooking chamber body, the device is ready for operation.

It will be seen that I have provided an improved device which may be used either as a roaster or a broiler. Because of the location of the heater and the circulation of air within the cooking chamber, changes in temperature of the heating unit are transmitted rapidly to the food being cooked. Therefore, a heater producing less B. t. u. than conventional heaters may be used to accomplish equivalent cooking. Together with the wall construction of the body of the cooker, which minimizes heat losses, this low operating heat provides extremely economical operation.

As will be evident from the foregoing description, certain aspects of my invention are not limited to the particlar details of construction of the exemplary embodiment illustrated, and I contemplate that various modifications and applications of the invention will suggest themselves to one skilled in the art. It is my intention, therefore, that the appended claims shall cover such modifications and other applications as do not depart from the true spirit and scope of my invention.

What I claim as new and desire to secure by Letters Patent of the United States is:

1. An electrical cooking appliance including an open top well, a cover for said well, a motor carried by said cover, a centrifugal fan centrally located on the under side of and adjacent to said cover and driven by said motor, a baffle plate below said fan supported entirely in and by said cover and parallel to it with the free edges of said plate spaced from the boundary of the cover and having a central aperture opposite the center of said fan, and an annular heater surrounding said fan in the space between the baffle plate and the cover whereby air may be drawn from the well through the aperture in the plate, directed past the heater for heating in the space between the cover and plate and be discharged to the well at the edges of the plate for circulation in the well.

2. An electrical cooking appliance including an open top well, a removable dome-shaped cover for said well with bottom edges resting on said well, a motor carried by said cover, a fan centrally located on the underside of said cover and driven by said motor, a baffle plate entirely within the dome of said cover, spaced from said cover below said fan and supported by said cover, free edges on said plate spaced inwardly from said bottom edges of the cover, said plate having a central aperture therein below said fan, and an electrical resistance heater surrounding said fan in the space between the baffle plate and the cover whereby air may be circulated in the well by said fan, passing through the aperture in the plate and around the edges of the plate and being heated by the heater in the space between the cover and plate.

3. An electrical cooking appliance including a sheet metal shell forming a well, upper edges on said shell defining an open top, a removable dome-shaped cover for said well with downwardly directed bottom edges resting on said upper edges, an electric motor carried by said cover, a driven shaft from said motor extending downwardly inside the cover dome at the center of the cover, a centrifugal fan secured to said shaft under and close to said cover and driven by said motor, a horizontal baffle plate entirely within the dome of said cover, spaced from said cover below said fan, supported by said cover and generally parallel to it, free edges on all sides of said plate spaced inwardly from said bottom edges of the cover, said plate having a central aperture therein below and opposite the center of said fan, and an annular electrical resistance heater surrounding said fan in the space between the baffle plate and the cover, said heater being located inwardly of the edges of the baffle, whereby air may be drawn centrally upward by the fan from the well through the aperture in the plate, directed outwardly past the heater for heating in the space between the cover and plate and be discharged downwardly back to the well at the free edges of the plate for circulation in the well.

4. An electrical cooking appliance including a body assembly consisting of a sheet metal shell forming an outer well, upper edges on said shell defining an open top, a discrete removable inner sheet metal well supported by the upper edges of the shell but otherwise narrowly spaced therefrom to complete said body, a dome-shaped sheet metal cover removably mounted on said body, adapted to close said inner well, an electric motor carried by said cover, a centrifugal fan centrally located on the underside of and adjacent to said cover and driven by said motor, a baffle plate entirely within the dome of said cover, spaced from said cover below said fan, supported by said cover and generally parallel to it, free edges on said plate spaced inwardly from the boundary of the cover, said plate having a central aperture therein below and opposite the center of said fan, and an annular electrical resistance heater surrounding said fan in the space between the baffle plate and the cover whereby air may be drawn from the inner well through the aperture in the plate, directed past the heater for heating in the space between the cover and plate and be discharged to the well at the edges of the plate for circulation in the well.

5. An electrical cooking appliance including an open top well, a removable dome-shaped cover for said well, a heat-reflecting inner surface in said cover facing said well, a motor carried by said cover, a centrifugal fan centrally located on the underside of and adjacent to said cover and driven by said motor, a shielding baffle plate below said fan removably supported in spaced relation entirely within and by said cover and generally parallel to it, free edges on said plate spaced inwardly from the boundary of the cover, said plate having a central aperture therein below and opposite the center of said fan, and an annular radiant electrical resistance heater surrounding said fan and located entirely in the space between the baffle plate and the reflecting surface in the cover, said baffle when in place shielding said well from direct radiation from said heater, whereby with the baffle in place roasting may be done in said well by fan-driven heated air without direct radiation from the heater to the well, while with the baffle removed cooking may be done by direct radiation from the heater and by reflection from the heat-reflecting inner surface of the cover to the well.

WALTER R. WEEKS.

REFERENCES CITED

The following references are of record in the file of this patent:

UNITED STATES PATENTS

| Number | Name | Date |
|---|---|---|
| 1,656,662 | Carter et al. | Jan. 17, 1928 |
| 1,797,519 | Brown et al. | Mar. 24, 1931 |
| 2,224,945 | Ames | Dec. 17, 1940 |
| 2,242,328 | Russell et al. | May 20, 1941 |
| 2,250,029 | Moon et al. | July 22, 1941 |
| 2,291,359 | Uhlrig et al. | July 28, 1942 |
| 2,334,056 | Anderson | Nov. 9, 1943 |
| 2,408,331 | Mills | Sept. 24, 1946 |
| 2,412,103 | Spooner | Dec. 3, 1946 |